(12) United States Patent
Picklo

(10) Patent No.: US 6,540,370 B1
(45) Date of Patent: Apr. 1, 2003

(54) ILLUMINATED WREATH SYSTEM

(75) Inventor: John Picklo, Oldsmar, FL (US)

(73) Assignee: Daniel R. Redmond, Jr., Palm Harbor, FL (US); part interest ( * ) Notice: Subject to any disclaimer, the term of this patent is extended or adjusted under 35 U.S.C. 154(b) by 0 days.

(21) Appl. No.: 09/776,219

(22) Filed: Feb. 2, 2001

(51) Int. Cl.[7] ............................................. F21S 6/00
(52) U.S. Cl. .................. 362/122; 362/397; 362/398; 362/540
(58) Field of Search .................. 362/86, 122, 123, 362/249, 252, 276, 397, 806, 811, 396, 540, 398, 496

(56) References Cited

U.S. PATENT DOCUMENTS

| | | | | |
|---|---|---|---|---|
| 2,753,441 A | * | 7/1956 | Kuykendall | 362/122 |
| 5,315,492 A | * | 5/1994 | Davenport | 362/122 |
| 5,455,750 A | * | 10/1995 | Davis et al. | 362/123 |
| 6,030,106 A | * | 2/2000 | Johnson | 362/802 |

* cited by examiner

Primary Examiner—Y. My Quach-Lee

(57) ABSTRACT

An illuminated wreath system comprises a base formed of a generally rigid material in a circular configuration having an exterior periphery and an interior periphery and with a central aperture. An electrical conductor is spirally wound around the base with a plurality of bulbs spaced along the length thereof. An electrical assembly is coupled to the ends of the electrical conductor and secured to the base. A receiver is secured to the base functioning as a switch for switching the bulbs between on and off. A remote control actuator is adapted to transmit signals to turn the bulbs on and off. A pair of connectors each has an axially interior end secured to the base and an axially exterior end adapted to be removably coupled to a vehicle.

5 Claims, 3 Drawing Sheets

ILLUMINATED WREATH SYSTEM

BACKGROUND OF THE INVENTION

1. Field of the Invention

The present invention relates to an illuminated wreath system and more particularly pertains to adorning the front of a vehicle with an ornament having remotely controlled bulbs.

2. Description of the Prior Art

The use of wreaths and other ornaments of known designs and configurations is known in the prior art. More specifically, wreaths and other ornaments of known designs and configurations previously devised and utilized for the purpose of adorning vehicles or other objects through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,364,102 to Huppert et al an internally lighted decorative display. U.S. Pat. No. 5,233,680 to Fussell discloses a wreath-shaped electrically activated aromatic ornament. U.S. Pat. No. 5,558,422 to Sanford discloses a decorative fiber optic light. U.S. Pat. No. 5,568,367 to Park discloses remote control with key lighting. U.S. Pat. No. 4,858,086 to Pietrantonio et al discloses internal illuminated decorative displays. Lastly, U.S. Pat. No. 6,017,132 to Miller et al discloses a decorative light-supporting structure for holding connected string of lights.

While these devices fulfill their respective, particular objectives and requirements, the aforementioned patents do not describe an illuminated wreath system that allows adorning the front of a vehicle with an ornament having remotely controlled bulbs.

In this respect, the illuminated wreath system according to the present invention substantially departs from the conventional concepts and designs of the prior art, and in doing so provides an apparatus primarily developed for the purpose of adorning the front of a vehicle with an ornament having remotely controlled bulbs.

Therefore, it can be appreciated that there exists a continuing need for a new and improved illuminated wreath system which can be used for adorning the front of a vehicle with an ornament having remotely controlled bulbs. In this regard, the present invention substantially fulfills this need.

SUMMARY OF THE INVENTION

In view of the foregoing disadvantages inherent in the known types of wreaths and other ornaments of known designs and configurations now present in the prior art, the present invention provides an improved illuminated wreath system. As such, the general purpose of the present invention, which will be described subsequently in greater detail, is to provide a new and improved illuminated wreath system and method which has all the advantages of the prior art and none of the disadvantages.

To attain this, the present invention essentially comprises an illuminated wreath system for adorning the front of a vehicle with an ornament. The ornament has remotely controlled bulbs. Recesses are provided in the grill on the front of a vehicle. A base is provided. The base is formed of a generally rigid plastic material in a circular configuration. The base has an exterior periphery and an interior periphery. A central aperture is provided through the base. In addition, the base has an upper extent and a lower extent. Provided between the upper extent and lower extent are lateral intermediate extents. Simulated foliage is secured to the base. Next provided is an electrical conductor in a string-like configuration. The electrical conductor is spirally wound around essentially the entire length of the base. The string has opposed free ends adjacent to the upper extent of the base. A plurality of bulbs are spaced along the length of and are electrically coupled to the electrical conductor. An electrical assembly is next provided. The electrical assembly is coupled to the free ends of the electrical conductor. The electrical assembly has a housing. The housing has an openable recess and removable cover. The housing also has batteries within the recess. The batteries are adapted to provide electrical power for illuminating the bulbs. The assembly is secured to the upper extent of the base and extends downwardly therefrom. In addition, a receiver is provided. The receiver is secured to the upper extent of the base and extends upwardly therefrom. The receiver functions as a switch for switching the bulbs between an illuminated condition and a non-illuminated condition. Next, a remote control actuator is provided. The actuator is in the form of a key chain formed as a wreath. The actuator has a transmitter and an operator control button. The button is adapted, upon depression, to transmit a first signal to activate the receiver to turn the bulbs to the illuminated condition. The button is adapted to transmit a second signal to turn the bulbs to the non-illuminated condition upon further depression. Lastly, a pair of connectors are provided. The connectors are received within the base at laterally spaced points adjacent to the intermediate extents of the base and extending radially inwardly therefrom. Each of the connectors has an axially interior end. The interior end is secured to the base. Each of the connectors also has an axially exterior end. The exterior end is formed as a hook. The exterior end is also adapted to be removably coupled to the recesses of the vehicle. A coil spring is provided intermediate the interior and exterior ends for the purpose of coupling and uncoupling.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved illuminated wreath system which has all of the advantages of the prior art wreaths and other ornaments of known designs and configurations and none of the disadvantages.

It is another object of the present invention to provide a new and improved illuminated wreath system which may be easily and efficiently manufactured and marketed.

It is further object of the present invention to provide a new and improved illuminated wreath system which is of durable and reliable constructions.

An even further object of the present invention is to provide a new and improved illuminated wreath system which is susceptible of a low cost of manufacture with regard to both materials and labor, and which accordingly is then susceptible of low prices of sale to the consuming public, thereby making such illuminated wreath system economically available to the buying public.

Even still another object of the present invention is to provide an illuminated wreath system for adorning the front of a vehicle with an ornament having remotely controlled bulbs.

Lastly, it is an object of the present invention to provide a new and improved illuminated wreath system comprising a base formed of a generally rigid material in a circular configuration having an exterior periphery and an interior periphery and with a central aperture. An electrical conductor is spirally wound around the base with a plurality of bulbs spaced along the length thereof. An electrical assembly is coupled to the ends of the electrical conductor and secured to the base. A receiver is secured to the base functioning as a switch for switching the bulbs between on and off. A remote control actuator is adapted to transmit signals to turn the bulbs on and off. A pair of connectors each has an axially interior end secured to the base and an axially exterior end adapted to be removably coupled a vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
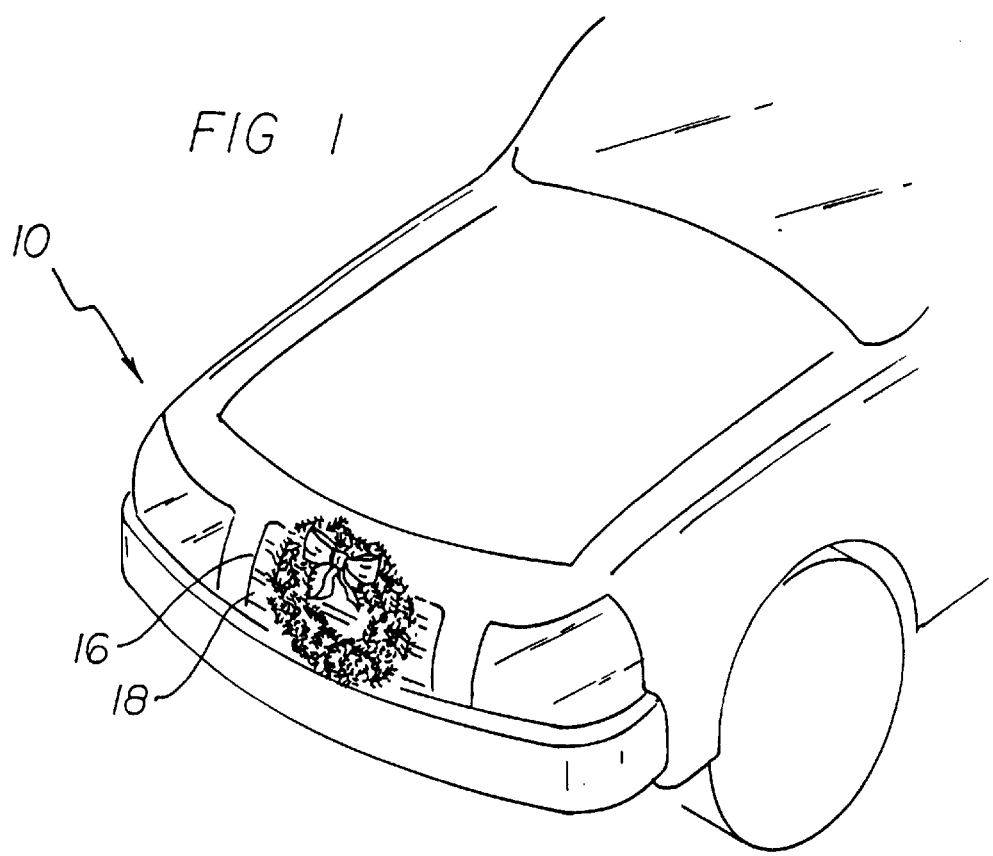
FIG. 1 is a perspective illustration of the illuminated wreath system constructed in accordance with the principles of the present invention.
Figure 2:
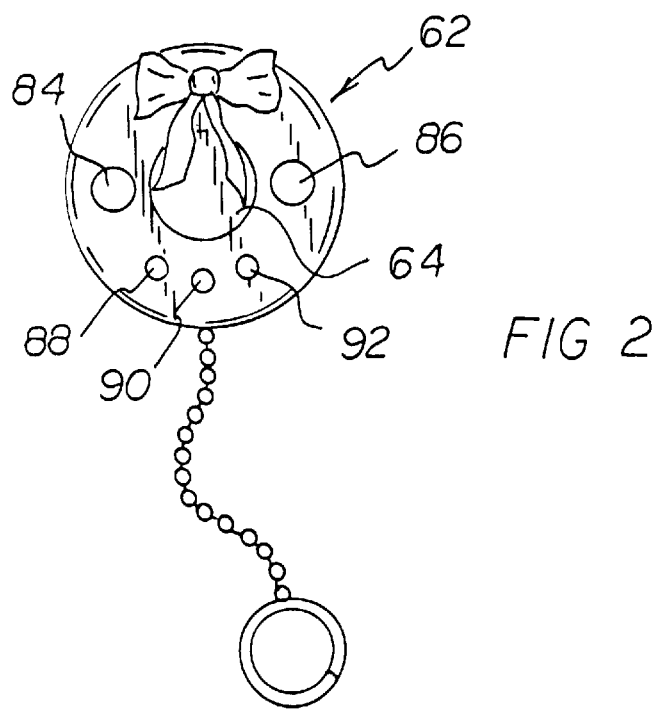
FIG. 2 is a front elevational view of the electrical control assembly for use with the wreath shown in FIG. 1.
Figure 3:
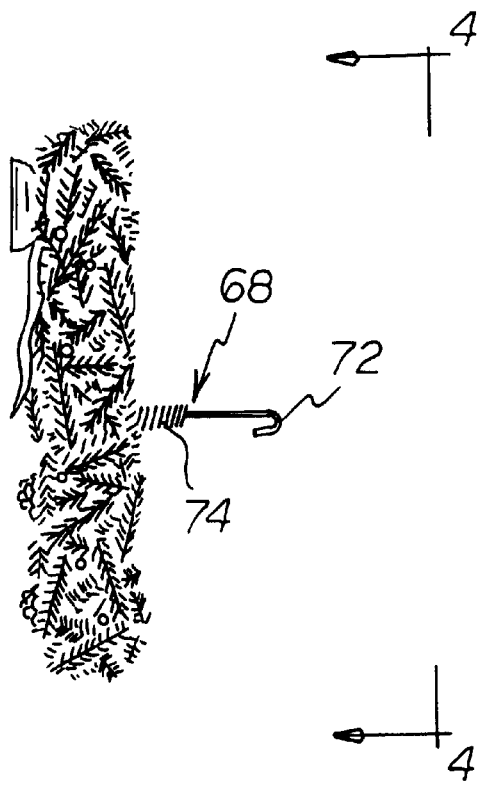
FIG. 3 is a side elevational view of the wreath shown in FIG. 1.
Figure 4:
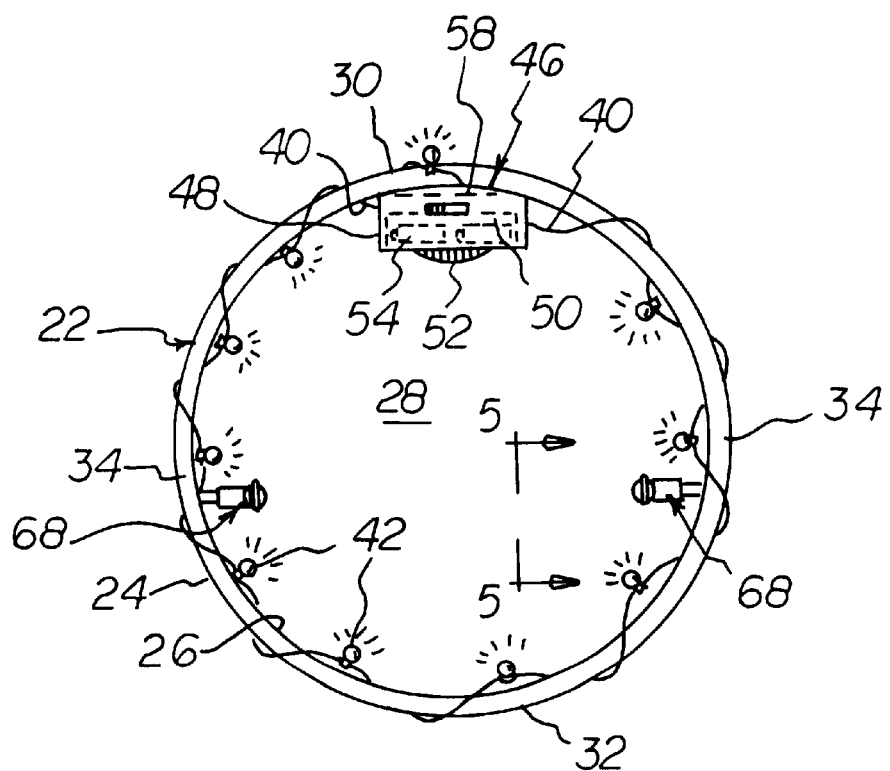
FIG. 4 is a front elevational view of the wreath shown in FIG. 3 but with the foliage removed.

With reference now to the drawings, and in particular to, FIG. 1 thereof, the preferred embodiment of the new and improved illuminated wreath system embodying the principles and concepts of the present invention and generally designated by the reference numeral 10 will be described.

The present invention, the illuminated wreath system 10 is comprised of a plurality of components. Such components in their broadest context include a base, an electrical conductor, an electrical assembly, a receiver, a remote control actuator and a pair of connectors. Such components are individually configured and correlated with respect to each other so as to attain the desired objective.

The illuminated wreath system 10 is for adorning the front of a vehicle with an ornament. The ornament has remotely controlled bulbs.

A grill 16 is on the front of a vehicle. Recesses 18 are provided in the grill.

A base 22 is provided. The base is formed of a generally rigid plastic material in a circular configuration. The base has an exterior periphery 24 and an interior periphery 26. A central aperture 28 is provided through the base. In addition, the base has an upper extent 30 and a lower extent 32. Provided between the upper extent and lower extent are lateral intermediate extents 34. Simulated foliage is secured to the base.

Next provided is an electrical conductor in a string-like configuration. The electrical conductor is spirally wound around essentially the entire length of the base. The string has opposed free ends 40 adjacent to the upper extent of the base. A plurality of bulbs 42 are spaced along the length of and are electrically coupled to the electrical conductor.

An electrical assembly 46 is next provided. The electrical assembly is coupled to the free ends of the electrical conductor. The electrical assembly has a housing 48. The housing has an openable recess 50 and removable cover 52. The housing also has batteries 54 within the recess. The batteries are adapted to provide electrical power for illuminating the bulbs. The assembly is secured to the upper extent of the base and extends downwardly therefrom.

In addition, a receiver 58 is provided. The receiver is secured to the upper extent of the base and extends upwardly therefrom. The receiver functions as a switch for switching the bulbs between an illuminated condition and a non-illuminated condition.

Next, a remote control actuator 62 is provided. The actuator is in the form of a key chain formed as a wreath. The actuator has a transmitter and an operator control button 64. The button is adapted, upon depression, to transmit a first signal to activate the receiver to turn the bulbs to the illuminated condition. The button is adapted to transmit a second signal to turn the bulbs to the non-illuminated condition upon further depression.

Lastly, a pair of connectors 68 are provided. The connectors are received within the base at laterally spaced points adjacent to the intermediate extents of the base and extending radially inwardly therefrom. Each of the connectors has an axially interior end 70. The interior end is secured to the base. Each of the connectors also has an axially exterior end 72. The exterior end is formed as a hook. The exterior end is also adapted to be removably coupled to the recesses of the vehicle. A coil spring 74 is provided intermediate the interior and exterior ends for the purpose of coupling and uncoupling.

Figure 5:
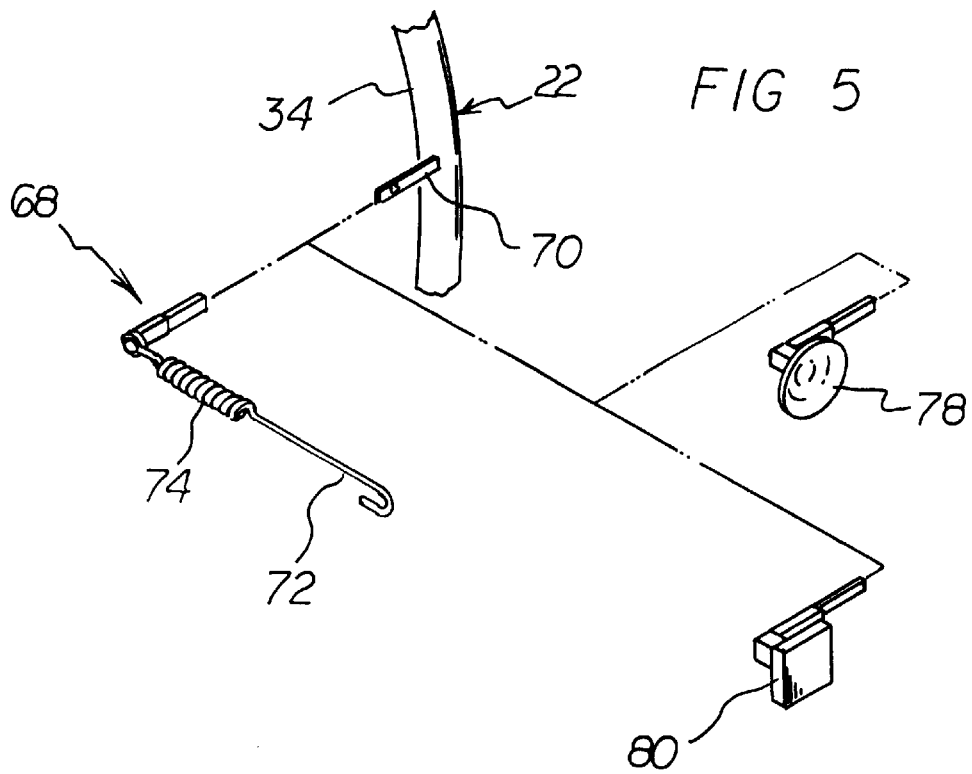
FIG. 5 is an enlarged exploded view taken at line 5—5 of FIG. 4 illustrating alternate connector components.
Figure 6:
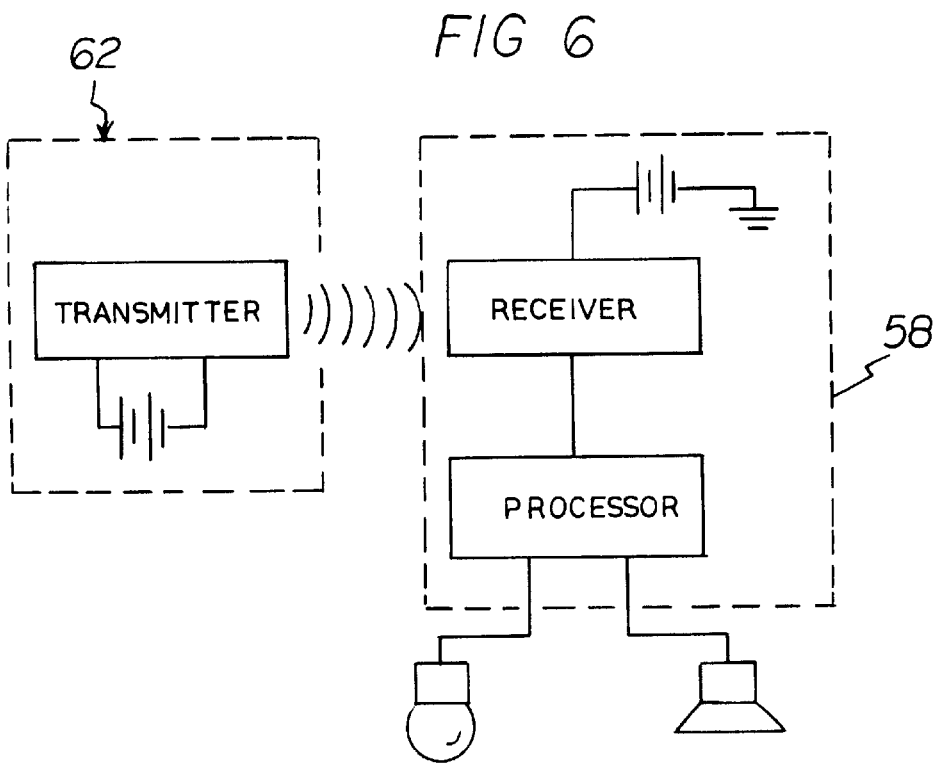
FIG. 6 is an electrical schematic for use in association with the system.

As shown in FIG. 5, in an alternate embodiment of the invention the connector is a pair of suction cups 78 or a pair of magnets 80. Such alternate connectors allow coupling to a wide variety of surfaces of cars, trucks, vans, RV's, boats, etc.

In another alternate embodiment, the electrical assembly includes an electrical processor to cause the bulbs to blink o, in the alternative to provide and play music from the wreath, as desired. In order to determine the mode of operation of the system, buttons 84 and 86 are for on and off. Buttons 88, 90 and 92 are for continuous lighting, blinking lighting, and music, all at the discretion of the user.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An illuminated wreath system for adorning a front of a vehicle with an ornament having remotely controlled bulbs comprising, in combination:

a grill on the front of a vehicle, the grill having recesses therein;

a base formed of a rigid plastic material in a circular configuration having an exterior periphery and an interior periphery and with a central aperture there through, the base having an upper extent and a lower extent and lateral intermediate extents there between, the base having simulated foliage secured thereto;

an electrical conductor in a string-like configuration, the electrical conductor being spirally wound around the base over essentially the entire length thereof, the string having opposed free ends adjacent to the upper extent of the base with a plurality of bulbs spaced along the length of the electrical conductor and electrically coupled thereto;

an electrical assembly coupled to the free ends of the electrical conductor, the electrical assembly having a housing with an openable recess and removable cover and batteries within the recess adapted to provide electrical power for illuminating the bulbs, the assembly being secured to the upper extent of the base and extending downwardly therefrom;

a receiver secured to the upper extent of the base and extending upwardly therefrom, the receiver functioning as a switch for switching the bulbs between an illuminated condition and a non-illuminated condition;

a remote control actuator in the form of a key chain formed as a wreath with a transmitter and an operator control button which, upon depression, is adapted to transmit a first signal to activate the receiver to turn the bulbs to the illuminated condition and which, upon further depression, is adapted to transmit a second signal to turn the bulbs to the non-illuminated condition; and a pair of connectors received within the base at laterally spaced points adjacent to the intermediate extents of the base and extending radially inwardly therefrom, each of the connectors having an interior end secured to the base and an exterior end formed as a hook adapted to be removably coupled to the recess of the vehicle with a coil spring intermediate the interior and exterior ends for coupling and uncoupling purposes.

2. An illuminated wreath system comprising:

a base formed of a rigid material in a circular configuration having an exterior periphery and an interior periphery and with a central aperture;

an electrical conductor spirally wound around the base with a plurality of bulbs spaced along the length thereof;

an electrical assembly coupled to the ends of the electrical conductor and secured to the base;

a receiver secured to the base functioning as a switch for switching the bulbs between on and off;

a remote control actuator adapted to transmit signals to the receiver to turn the bulbs on and off; and a pair of connectors received within the base at laterally spaced points adjacent to the intermediate extents of the base and extending radially inwardly therefrom, each of the connectors having an interior end secured to the base and an exterior end formed as a hook adapted to be removeably coupled to a recess of a vehicle with a coil spring intermediate the interior and exterior ends for coupling and uncoupling purposes.

3. An illuminated wreath system comprising:

a grill on the front of a vehicle, the grill having recesses therein;

a base formed of a rigid material in a circular configuration having an exterior periphery and an interior periphery and with a central aperture;

an electrical conductor spirally wound around the base with a plurality of bulbs spaced along the length thereof;

an electrical assembly coupled to the ends of the electrical conductor and secured to the base;

a receiver secured to the base functioning as a switch for switching the bulbs between on and off;

a remote control actuator adapted to transmit signals to the receiver to turn the bulbs on and off; and a pair of connectors received within the base at laterally spaced points adjacent to the intermediate extents of the base and extending radially inwardly therefrom, each of the connectors having an interior end secured to the base and an exterior end adapted to be removably coupled to the grill of a vehicle adjacent to the recesses.

4. The illuminated wreath system as set forth in claim 3 wherein the exterior ends of the connectors include suction cups.

5. The illuminated wreath system as set forth in claim 3 wherein the exterior ends of the connectors include magnets.

* * * * *